United States Patent [19]

Tolan

[11] 4,061,524
[45] Dec. 6, 1977

[54] ADJUSTABLE TRAVERSE TIRE BELT WINDING APPARATUS

[75] Inventor: John R. Tolan, South Bend, Ind.

[73] Assignee: Milliken Research Corporation, Spartanburg, S.C.

[21] Appl. No.: 616,381

[22] Filed: Sept. 24, 1975

[51] Int. Cl.$^2$ .......................................... B29H 17/28
[52] U.S. Cl. ................................... 156/397; 156/175; 242/43 R; 308/62
[58] Field of Search ................ 156/123, 128 R, 128 I, 156/130, 169, 173, 175, 177, 181, 187, 394, 397, 433, 439, 440, 443; 242/43 R, 43.1, 158 R, 158.1, 158.5; 308/62

[56] References Cited

U.S. PATENT DOCUMENTS

| 2,380,867 | 7/1945 | Packer | 308/62 |
|---|---|---|---|
| 2,388,557 | 11/1945 | Little et al. | 242/43 |
| 2,650,036 | 8/1953 | Berkepeis | 242/43 |
| 2,828,795 | 4/1958 | Hartstein | 156/440 |
| 3,002,874 | 10/1961 | Lowe | 156/397 |
| 3,353,759 | 11/1967 | Sternberg | 242/43 |
| 3,367,602 | 2/1968 | Morling | 242/158.1 |
| 3,558,401 | 1/1971 | Cole | 156/397 |
| 3,729,365 | 4/1973 | Greene | 156/169 X |
| 3,748,203 | 7/1973 | Greene | 156/128 I |
| 3,761,341 | 9/1973 | Kimble | 156/173 X |

Primary Examiner—Douglas J. Drummond
Assistant Examiner—John E. Kittle
Attorney, Agent, or Firm—Robert S. Alexander; H. William Petry

[57] ABSTRACT

Apparatus for forming a tire reinforcing belt by positioning continuous cord on a movable support surface in a zigzag pattern including a traversing guide member, drive means for moving the support surface and for traversing the guide member, cam means operatively connecting the drive means and the guide member, and moving means for changing the position of the guide member and the cam means with respect to the support surface.

7 Claims, 12 Drawing Figures

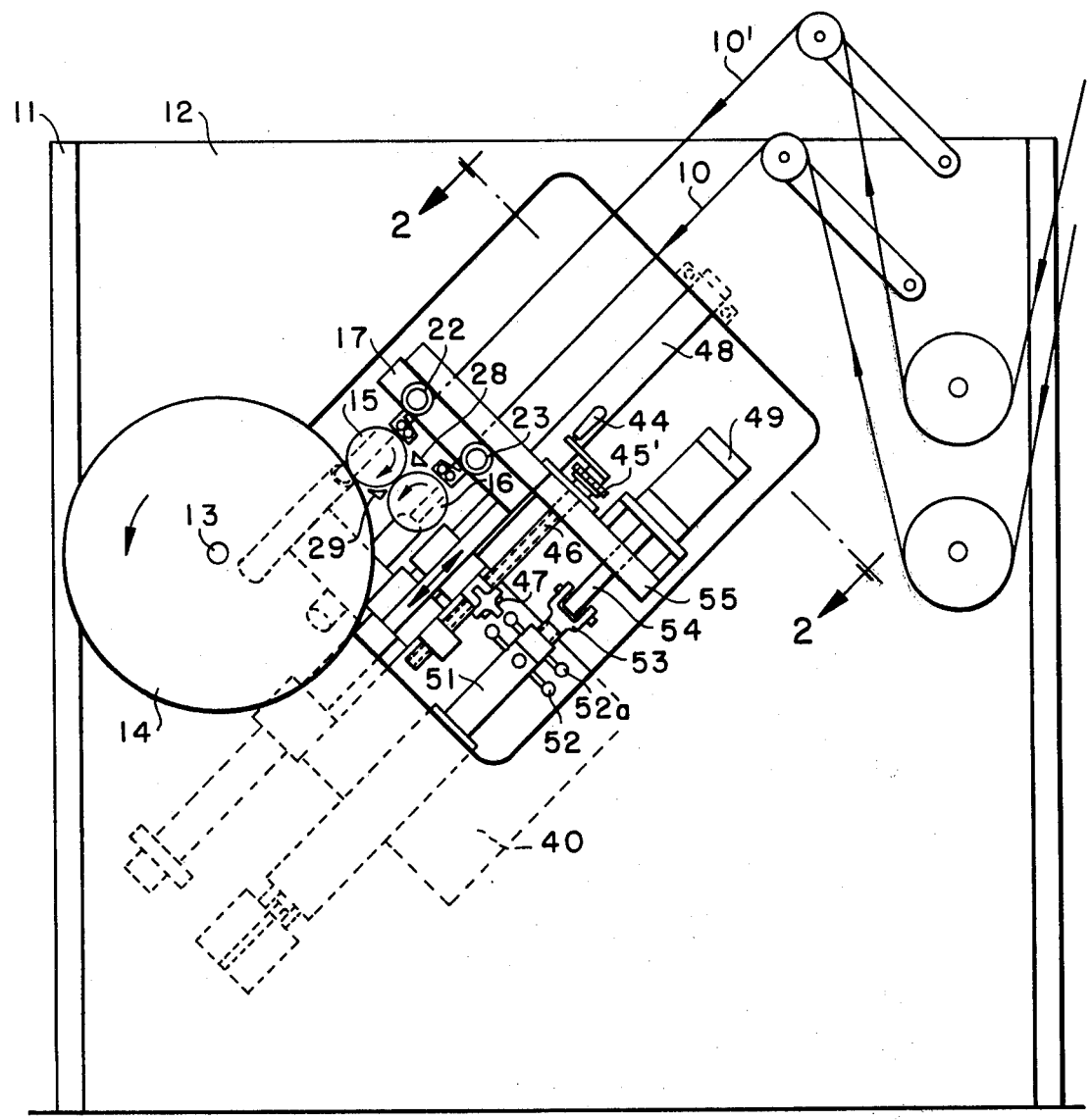
FIG.-1-

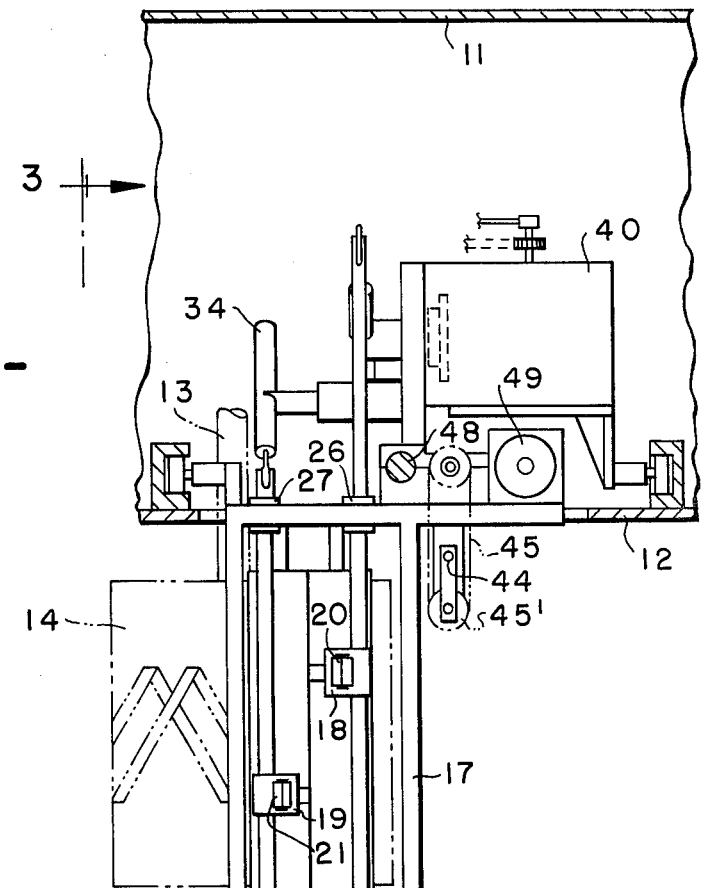
FIG.-2-
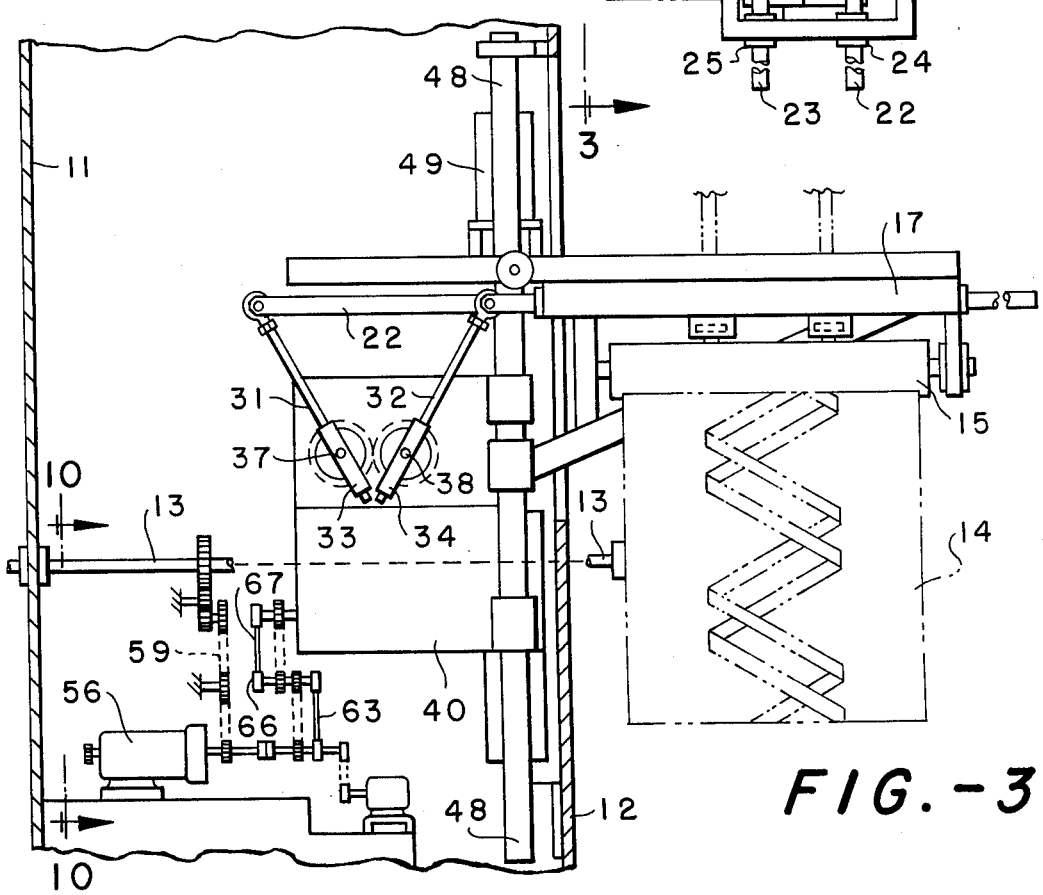
FIG.-3-

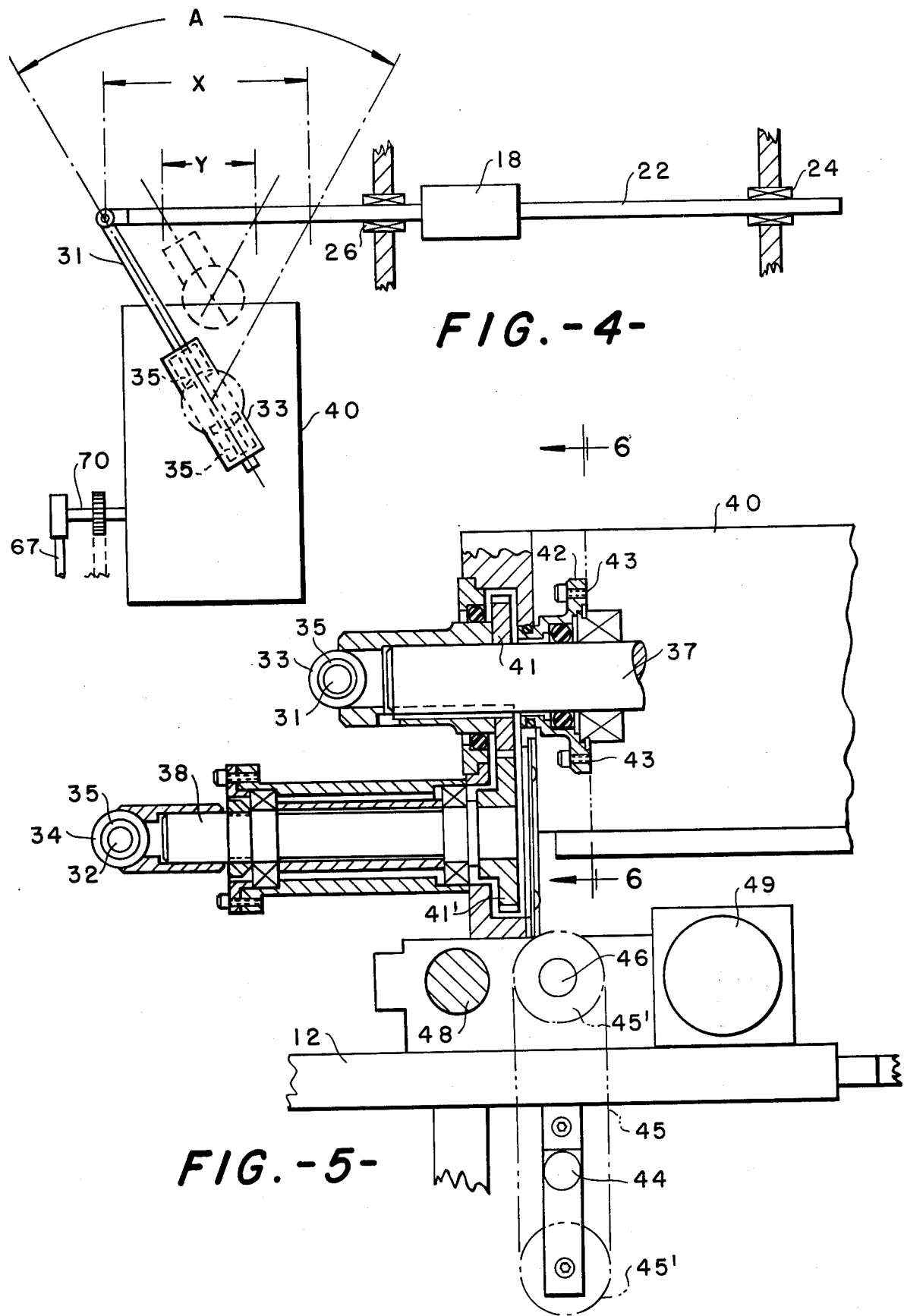

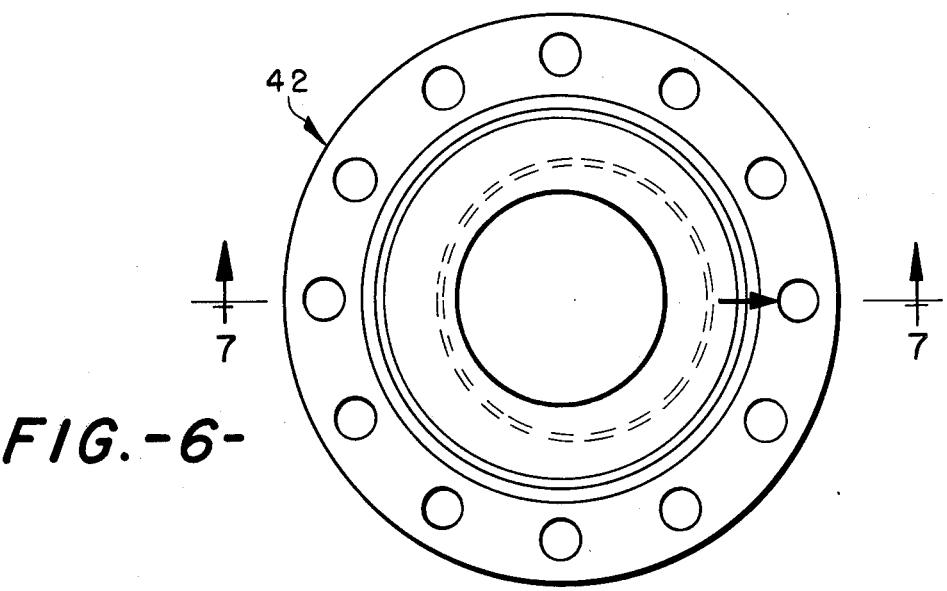
FIG.-6-
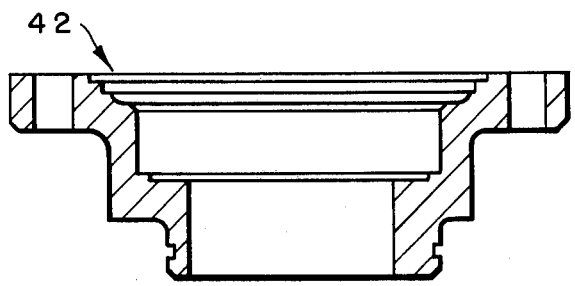
FIG.-7-
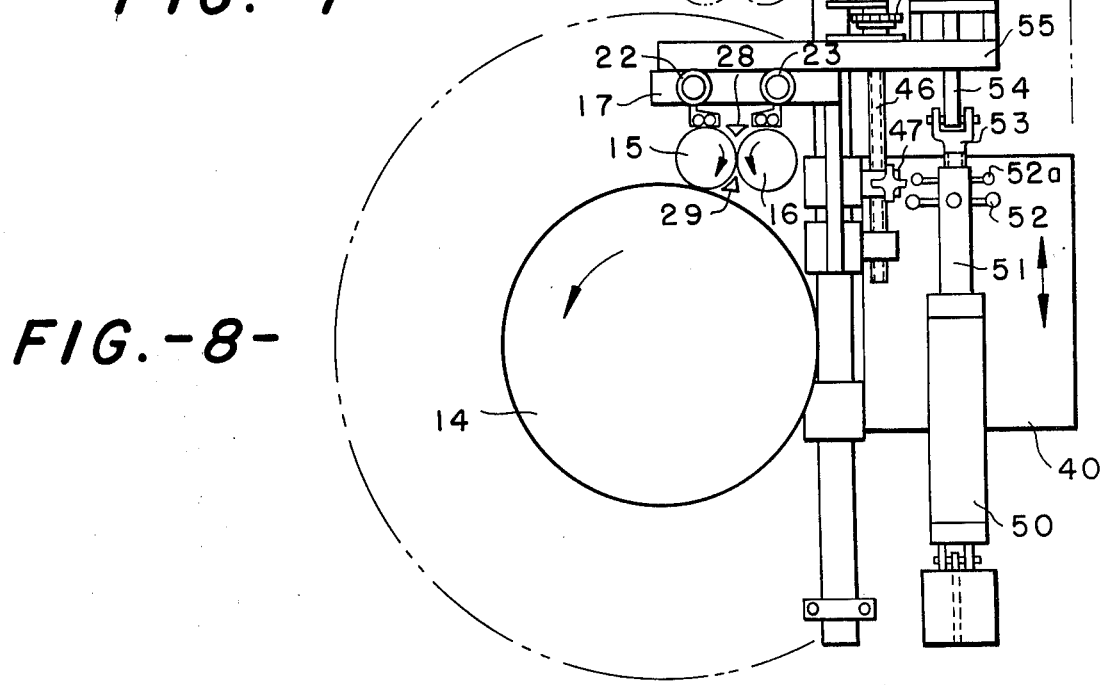
FIG.-8-

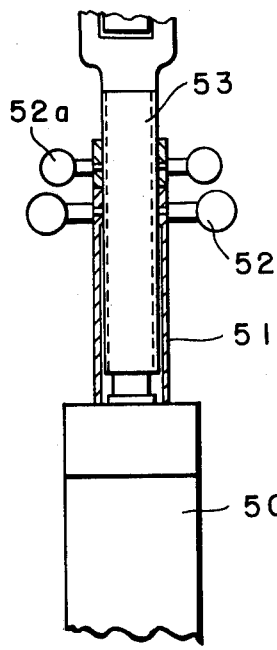
FIG.-9-
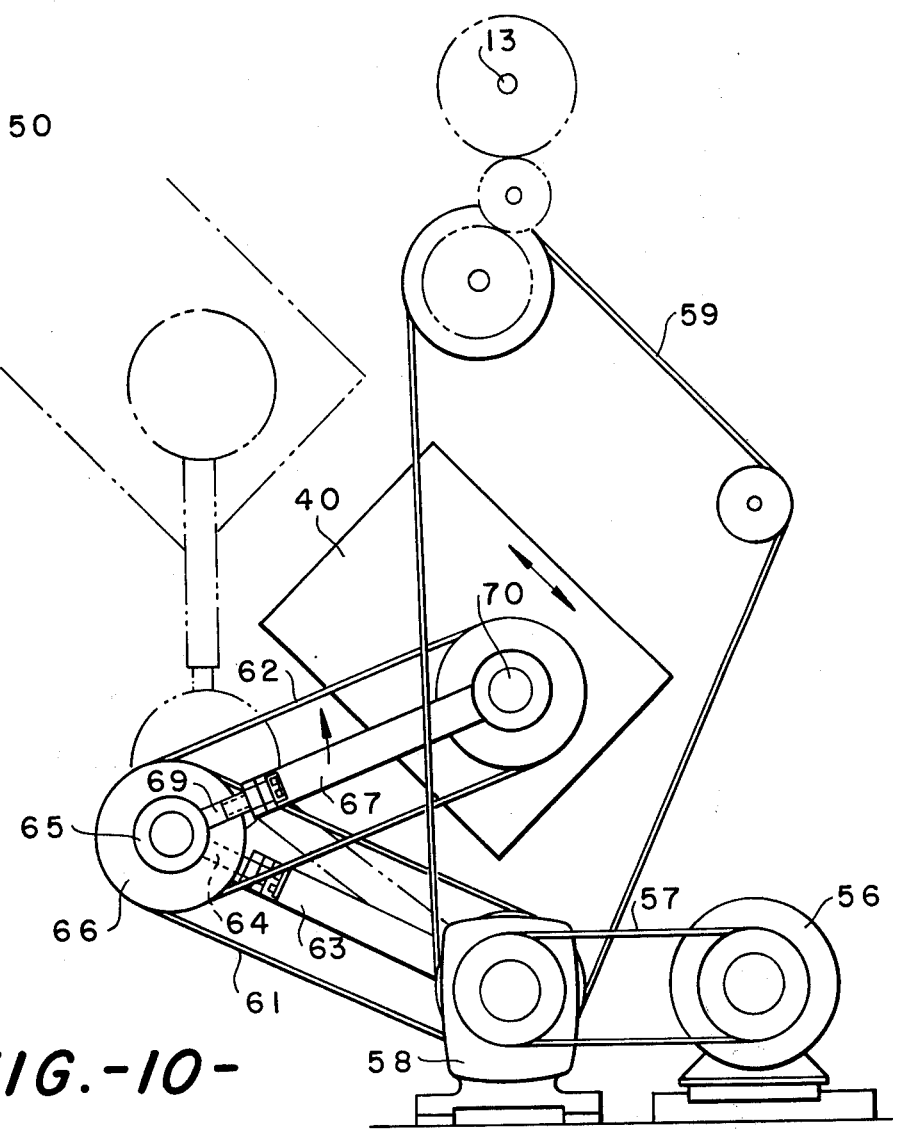
FIG.-10-

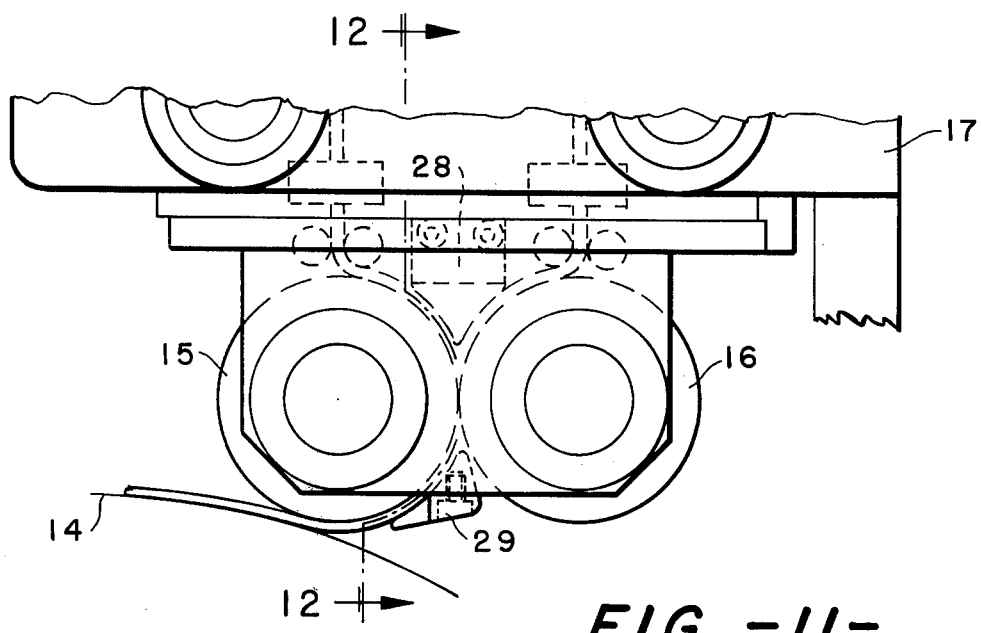
FIG.-11-
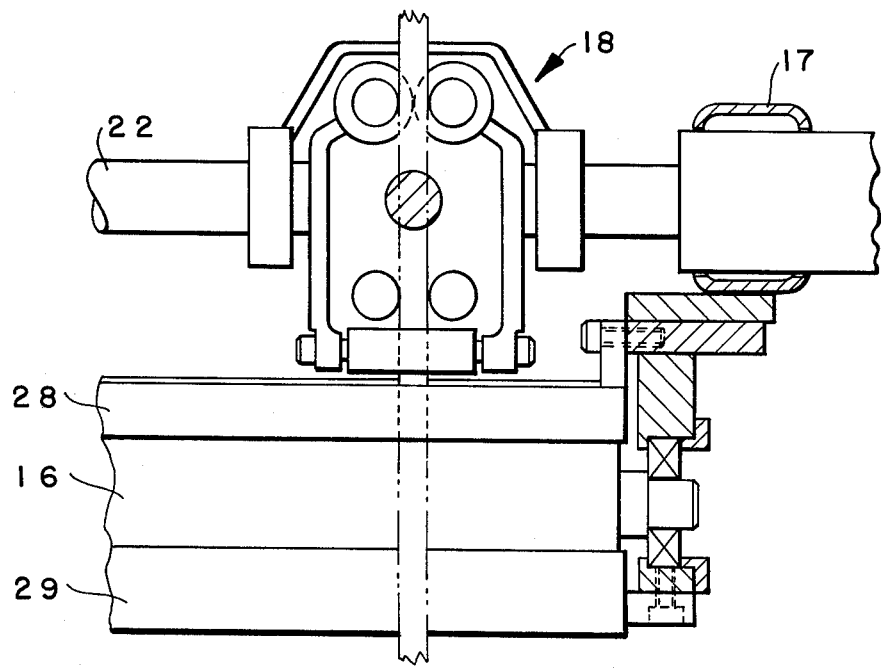
FIG.-12-

ADJUSTABLE TRAVERSE TIRE BELT WINDING APPARATUS

This invention relates to an apparatus for winding endless reinforcements or belts for belted tires and more particularly relates to an apparatus which provides a high degree of flexibility in the types of tire belts which can be produced.

In recent years, most tire manufacturers have included a tread reinforcing belt between the carcass and the tread portion of the tire. Such belted tires have better road stability and longer tread life both in radial ply and bias ply carcass constructions. The belts are conventionally formed of wire or cord coated with or embedded in a suitable insulating material such as rubber, which is compatible with and has an adhesive affinity for the rubber of the tire. The cord usually is disposed at an angle to the longitudinal axis of the belt. One common construction utilizes bias cut fabric which has been calendered with unvulcanized rubber. Also, it has been proposed to form belts by winding one or more cords or strips onto a rotating drum in a generally zig-zag pattern employing a reciprocating guide to position the cord or strip. Examples of such belts are disclosed in U.S. Pat. Nos. 2,982,327; 3,720,569; 3,720,570 and 3,729,365.

One of the problems in producing a commercially successful tire belt is maintaining the dimensions of the belt within close tolerances. Furthermore, since a manufacturer ordinarily makes a range of tire sizes, belts of significantly different dimensions must be manufactured to accommodate the various sizes. Apparatus to produce such belts must have a high degree of flexibility while at the same time being capable of forming belts with accurate dimensions quickly and with minimum downtime.

The present invention provides a novel apparatus for producing belts of widely varying dimensions both in diameter and width and with different winding patterns. Moreover, the apparatus of the invention is capable of producing such tire belts rapidly and with a high degree of pattern accuracy over extended operating periods.

Other advantages and benefits of the invention will be apparent from the following detailed discussion and description of the drawings in which:

FIG. 1 is a schematic front elevation of one form of apparatus of the invention for forming an endless reinforcement;

FIG. 2 is a sectional view taken along line 2—2 of FIG. 1;

FIG. 3 is a sectional view taken along line 3—3 of FIG. 2;

FIG. 4 is an enlarged schematic illustration showing the operation of a guide member;

FIG. 5 is a further enlarged view partially in section of the output of the cam drive;

FIG. 6 is an enlarged fragmentary view taken along line 6—6 of FIG. 5;

FIG. 7 is a sectional view taken along line 7—7 of FIG. 6;

FIG. 8 is a side elevation of the elements which move the guide members and press rolls;

FIG. 9 is an enlarged fragmentary view of a portion of one of the adjustment elements shown in FIG. 8;

FIG. 10 is an enlarged view taken along line 10—10 of FIG. 3;

FIG. 11 is an enlarged fragmentary view of the press roll and guide portion of the apparatus shown in FIG. 1; and FIG. 12 is a sectional view taken along line 12—12 of FIG. 11;

As shown in the drawings, one form of apparatus for producing a tire reinforcing belt by positioning one or more cords or strips on a support surface includes a frame 11 having a front panel 12 through which extends a shaft 13 on which is mounted a rotatable drum 14. Positioned adjacent drum 14 and extending from front panel 12 are press roll 15, transfer roll 16 and rectangular box guide frame 17.

Guide frame 17 has guide members 18 and 19 with removable guide inserts 20 and 21 respectively. Guide members 18 and 19 are secured to traverse rods 22 and 23 respectively which are carried by bushings 24 and 25 disposed in the outer end of guide frame 17 and bushings 26 and 27 disposed in the inner end of the guide frame. Also, guide bars 28 and 29 are mounted on guide frame 17 adjacent the nip of rolls 15 and 16. Traverse rods 22 and 23 are connected to lever arms 31 and 32 respectively which extend through bushings 35 disposed in sleeves 33 and 34. Sleeves 33 and 34 are mounted for rotation with shafts 37 and 38 as shown in FIG. 5. Shaft 37 is the output shaft of cam drive 40. Shaft 38 is rotatably connected to shaft 37 through gears 41, 41'.

To minimize backlash between shafts 37 and 38, cam drive 40 is provided with means for changing the distance between the two shafts. As shown in FIG. 6, an eccentric bearing cap 42 has a plurality of mounting holes around the periphery thereof which vary slightly in their distance from the surface of the cap which registers with the gear housing. The mounting hole at the 9 o'clock position is farthest from the axis of the register surface of the cap and the mounting hole at the 3 o'clock position is closest to the axis of the register surface of the cap with the mounting holes from the 9 o'clock position to the 3 o'clock position being spaced at decreasing distances from the axis. By rotating the cap prior to securing it to the housing of cam drive 40 with bolts 43, the distance between shafts 37 and 38 can be slightly changed so that the backlash of gear 41 secured thereto may be minimized with respect to gear 41' secured to shaft 38. In this way, the play in the traverse of guide members 18 and 19 operatively connected to the shafts 37 and 38 through traverse rods 22 and 23 and lever arms 31 and 32 is reduced to a minimum.

As shown schematically in FIG. 4, the width of the traverse of guide members 18 and 19 can be changed by repositioning cam drive 40. For example, as the cam drive 40 is moved closer to traverse rod 22 by sliding sleeve 33 along lever arm 31, the distance that traverse rod 22 will be moved in a single cycle of the cam drive 40 will be reduced even though the lever arm 31 moves through the same angle. Thus, as lever arm 31 moves through an angle A, traverse rod 22 will move a distance X. However, when cam drive 40 is positioned closer to traverse rod 22 as shown in the dotted portion of FIG. 4, traverse rod 22 will only move the shorter distance Y as lever arm 31 moves through the same angle A. The position of cam drive 40 with respect to traverse rod 22 is adjustable by handle 44 connected by a chain 45 and sprockets 45' to a screw 46 which engages threaded nut 47 secured to cam drive 40. In this way, the traversing distance of the guide members may be changed for the production of different width tire belts without changing the operation of cam drive 40.

In the apparatus shown in the drawings, guide frame 17 plus cam drive 40 as well as rolls 15 and 16 and guide bars 28 and 29 are mounted for movement along a rod 48. Movement thereof is accomplished through a pair of cooperating cylinders 49 and 50 with cylinder 49 having a short stroke to provide a slow controlled movement adjacent the drum 14 and cylinder 50 having a long stroke to provide a relatively rapid movement at distances spaced from the drum. The line of retraction of the rolls and guide frame preferably is offset from a radius of the drum. This avoids an error in the deposition of the strips after cutting, that is, the last portions of the strips positioned after cutting to complete a belt and also the first portions of the strips deposited at the beginning of a subsequent belt are not distorted by variations in the lengths of the strips resulting from retraction.

Adjustment ring 51 of cylinder 50 which is anchored to frame 11 has a rotatable internally threaded piston rod with a handle 52 and a locking ring 52a which engages threaded link 53 pivotally connected to piston rod 54 of piston 49. Piston 49 is mounted on platform 55 to which the guide frame 17, rolls 15, 16 and cam drive 40 are attached. Rotation of handle 52 changes the position of platform 55 and the elements attached thereto to provide manual adjustment with respect to the drum 14. Such manual adjustment may be utilized when changing from a drum of one diameter to one of a different size as shown in FIG. 8.

Drum 14 and cam drive 40 are driven by a motor 56 as shown in FIG. 10. Motor 56 is connected by a belt 57 and appropriate pulleys to a speed reducer 58 which in turn is connected through a belt 59, appropriate pulleys and change gears to shaft 13 on which drum 14 is mounted. Since cam drive 40 is movable, speed reducer 58 is operatively connected thereto through a dual belt 61, 62 and pulley-arm arrangement which forms an elbow connection.

The tension in the belts 61 and 62 is adjusted by providing a two piece interconnecting arm between the collars of pulleys connected by the same belt. For example, speed reducer 58 and the collar 65 of the intermediate pulley 66 are connected by sleeve 63 threadedly engaging rod 64. In the same way, sleeve 67 threadedly engages 69 to provide an adjustable connection between cam drive 40 and the collar 65 of the intermediate pulleys.

By providing pulleys of the same size on speed reducer 58 and the input of cam drive 40 as well as the intermediate pulleys, the position of cam drive 40 may be changed without changing the phase relationship between input shaft 70 of cam drive 40 and drum shaft 13.

In the operation of the apparatus shown in the drawings, strips 10 and 10' are drawn through guide members 18 and 19, past guide bar 28 and onto rolls 15 and 16. Strip 10 is transferred from roll 16 to roll 15 where it joins strip 10' and both strips then pass guide bar 29 and are pressed against the surface of drum 14. The traversing of guide members 18 and 19 and rotation of the drum causes the strips to be wound in a zigzag pattern. The winding operation is continued a plurality of drum revolutions until the belt is completed, that is, the strips have been positioned according to a preselected uniform pattern which generally contains no openings between adjacent strips. At this point, cylinder 49 is actuated to withdraw the rolls 15 and 16, guide bars 28 and 29 and the guide frame 17 a short distance to permit cutting of the strips. Thereafter, cylinder 50 is actuated withdrawing the guides and rolls a greater distance to permit removal of the completed belt. Since cam drive 40 moves with guide members 18 and 19, it also will move along rod 48. At the same time, the belt and pulley connections between cam drive 40 and speed reducer 58 move into an extended position as shown in the dotted portion of FIG. 10.

After the completed belt has been removed from the drum 14, cylinder 50 is reversed and the rolls 15 and 16, the guide frame 17, guide bars 28 and 29 and the cam drive 40 return to a point close to the drum 14 at which cylinder 49 draws press roll 15 into contact with drum 14. A new belt is then wound by beginning the rotation of drum 14 and positioning the strips 10 and 10' thereon according to the above procedure.

If it is desired to produce a belt of a different width, handle 44 is turned causing screw 46 to move with respect to threaded nut 47 secured to cam drive 40. This causes cam drive 40 to be moved with respect to traverse rods 22 and 23 and as described above and shown in FIG. 4, the distance that the push rods move in each stroke between reversals will be changed.

The above description and the drawings show that the present invention provides a novel apparatus for producing tire reinforcing belts of widely varying dimensions both in diameter and width and with different winding patterns. Furthermore, the apparatus of the invention provides for the production of such belts at a rapid rate and with a high degree of pattern accuracy over extended production periods.

It will be apparent that modifications and variations in the apparatus described in detail and shown in the drawings may be made within the scope of the invention. For example, the arrangement of the various elements may be changed to accommodate different structures or to meet space limitations. Therefore, the invention is to be limited only by the following claims.

That which is claimed is:

1. Apparatus for forming a tire reinforcing belt by positioning a continuous cord on a rotatable support surface in a zig-zag pattern comprising:
   a frame;
   a support surface rotatably mounted on said frame;
   means to rotate said support surface;
   a traversing guide reciprocably mounted on said frame;
   means for supplying cord to said support surface over said traversing guide;
   a shaft mounted on said frame and adapted for rotational reciprocation about its longitudinal axis;
   connecting means for reciprocating the traversing guide in response to rotational reciprocation of the shaft; and
   means operably associated with the traversing guide for changing the length of travel of the traversing guide, said means for changing the length of travel of the traversing guide including a means to vary the perpendicular distance between the path of said traversing guide and said shaft.

2. The apparatus of claim 1 wherein the connecting means for reciprocating the traversing guide in response to rotational reciprocation of the shaft comprises:
   a rod connected to said traversing guide; and
   a sleeve attached to said shaft and slidably mounted on said rod.

3. Apparatus for forming a tire reinforcing belt by positioning continuous cords on a rotatable support surface in a zig-zag pattern, including:

a frame;

a platform movably mounted on said frame;

a first traversing rod reciprocably mounted on said platform;

a second traversing rod reciprocably mounted on said platform;

a first traversing guide member attached to the first traversing rod adjacent to said rotatable support surface;

a second traversing guide member attached to the second traversing rod adjacent to said rotatable support surface;

a first shaft, adapted for reciprocation about its axis of rotation mounted on said platform;

an eccentric collar member having a bearing surface and a plurality of holes through said collar member the centers of said holes lying evenly spaced on the same circle, the center of which circle is offset from the centerline of said bearing surface;

means for mounting said eccentric collar member on said platform, said means including a member having a plurality of holes evenly positioned on a circle;

a second shaft mounted on said platform, supported by said eccentric collar member and adapted for reciprocation about its axis of rotation;

means for rotationally reciprocating one of said shafts in response to rotational reciprocation of the other;

means for traversing the first traversing rod in response to rotational reciprocation of the first shaft;

means for traversing the second traversing rod in response to rotational receiprocation of the second shaft;

drive means mounted on said frame for rotating said support surface;

drive means mounted on said platform for rotationally reciprocating said shafts; and means for moving said platform relative to said support surface.

4. The apparatus of claim 3 further comprising means for adjustably positioning said first and second shafts relative to said first and second traversing rods and wherein the means for traversing each traversing rod in response to reciprocation of the corresponding shaft comprises:

a sleeve having a bore therethrough mounted on said shaft;

and a connecting rod disposed for reciprocation within said bore and pivotably joined to said traversing rod.

5. Apparatus for forming a tire-reinforcing belt by positioning cord on a rotatable surface in a zig-zag pattern, comprising:

a frame;

a support surface rotatably supported by said frame;

a pair of guide members mounted for linear reciprocation on said frame adjacent to said support surface;

means for supplying cord to said support surface over each of said guide members;

means mounted on said frame for reciprocating each of said guide members, each said means including a shaft member operably associated with each of said guide members, said shaft members being spaced from one another, means for rotationally reciprocating one of said shaft members, means for rotationally reciprocating the other of said shaft members in response to rotational reciprocation of said one shaft member; and means for adjusting the length of traverse of said guides, said means including means for varying the perpendicular distance between said shaft members and the path of said guide members.

6. The device of claim 5 further comprising means for minimizing the backlash between said shaft members, including a collar member telescoped over a portion of one of said shaft members, said collar member having a bearing surface and a plurality of holes through said collar member, the centers of said holes lying evenly spaced on the same circle, the centerline of the circle being offset from the centerline of said bearing surface.

7. The device of claim 5 wherein the means for reciprocating each of said guide members further includes a rod member connected to each of said traversing guide and a sleeve member slidably mounted on each said rod member and connected to said shaft member.

* * * * *

UNITED STATES PATENT OFFICE
CERTIFICATE OF CORRECTION

Patent No. 4,061,524          Dated  December 6, 1977

Inventor(s)  John R. Tolan

It is certified that error appears in the above-identified patent and that said Letters Patent are hereby corrected as shown below:

Column 3, line 47, insert --rod-- between "engages" and the numeral "69".

Signed and Sealed this

Fourth Day of July 1978

[SEAL]

Attest:

RUTH C. MASON
*Attesting Officer*

DONALD W. BANNER
*Commissioner of Patents and Trademarks*